United States Patent
Choi

(10) Patent No.: US 10,803,563 B2
(45) Date of Patent: Oct. 13, 2020

(54) IMAGE PROCESSING APPARATUS AND METHOD

(71) Applicant: Hanwha Techwin Co., Ltd., Seongnam-si (KR)

(72) Inventor: Eun Cheol Choi, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 308 days.

(21) Appl. No.: 16/007,096

(22) Filed: Jun. 13, 2018

(65) Prior Publication Data
US 2019/0244333 A1   Aug. 8, 2019

(30) Foreign Application Priority Data
Feb. 6, 2018   (KR) .................. 10-2018-0014716

(51) Int. Cl.
*G06T 5/00* (2006.01)
*G06T 5/40* (2006.01)
*G06T 5/50* (2006.01)

(52) U.S. Cl.
CPC ............... *G06T 5/008* (2013.01); *G06T 5/40* (2013.01); *G06T 5/50* (2013.01); *G06T 2207/10024* (2013.01); *G06T 2207/20021* (2013.01); *G06T 2207/20208* (2013.01); *G06T 2207/20216* (2013.01)

(58) Field of Classification Search
None
See application file for complete search history.

(56) References Cited

U.S. PATENT DOCUMENTS

| | | | | |
|---|---|---|---|---|
| 6,377,625 B1 * | 4/2002 | Kim | ...................... | H04N 19/597 375/240.08 |
| 6,650,774 B1 * | 11/2003 | Szeliski | .................. | G06T 5/008 348/225.1 |
| 7,822,272 B2 | 10/2010 | Lei | | |
| 7,840,066 B1 * | 11/2010 | Chen | ....................... | G06T 5/002 382/168 |
| 8,165,419 B2 | 4/2012 | Min et al. | | |
| 8,648,873 B1 | 2/2014 | Tantalo et al. | | |
| 2007/0071318 A1 * | 3/2007 | Yamashita | ........... | H04N 1/4074 382/169 |

(Continued)

FOREIGN PATENT DOCUMENTS

KR   10-0916073 B1   9/2009

OTHER PUBLICATIONS

Patel, Omprakash, Yogendra PS Maravi, and Sanjeev Sharma. "A comparative study of histogram equalization based image enhancement techniques for brightness preservation and contrast enhancement." arXiv preprint arXiv:1311.4033 (2013). (Year: 2013).*

(Continued)

*Primary Examiner* — Kim Y Vu
*Assistant Examiner* — Nathan J Bloom
(74) *Attorney, Agent, or Firm* — Sughrue Mion, PLLC

(57) ABSTRACT

Provided are an image processing apparatus and method. The image processing apparatus divides an image into a plurality of blocks, and enhances contrast in units of blocks by using a minimum value, a lower average value, an average value, an upper average value, and a maximum value of each block in the image.

20 Claims, 6 Drawing Sheets

(56) References Cited

U.S. PATENT DOCUMENTS

| | | | | |
|---|---|---|---|---|
| 2007/0188623 A1* | 8/2007 | Yamashita | ................ | G06T 5/40 |
| | | | | 348/222.1 |
| 2013/0155125 A1* | 6/2013 | Inamura | ................... | G09G 5/10 |
| | | | | 345/690 |
| 2015/0244946 A1* | 8/2015 | Agaian | .................... | H04N 5/33 |
| | | | | 348/164 |
| 2018/0182070 A1* | 6/2018 | Gal | ......................... | G06T 5/008 |

OTHER PUBLICATIONS

C. R. Nithyananda, A. C. Ramachandra and Preethi, "Review on Histogram Equalization based Image Enhancement Techniques," 2016 International Conference on Electrical, Electronics, and Optimization Techniques (ICEEOT), Chennai, Mar. 2016, pp. 2512-2517, doi: 10.1109/ICEEOT.2016.7755145. (Year: 2016).*

\* cited by examiner

IMAGE PROCESSING APPARATUS AND METHOD

CROSS-REFERENCE TO THE RELATED APPLICATION

This application claims priority from Korean Patent Application No. 10-2018-0014716, filed on Feb. 6, 2018, in the Korean Intellectual Property Office, the disclosure of which is incorporated herein in its entirety by reference.

BACKGROUND

1. Field

Apparatuses and methods consistent with exemplary embodiments of the inventive concept relate to an image processing apparatus and method for enhancing contrast.

2. Description of the Related Art

Histogram equalization, which involves calculating a histogram of an entire image, obtaining a cumulative histogram, and uniformly spreading out the brightness (intensity) values of an image for a uniform brightness distribution, is used to enhance image contrast.

SUMMARY

Exemplary embodiments of the inventive concept provide an image processing apparatus and method for improving image quality and memory efficiency.

Various aspects of the inventive concept will be set forth in part in the description which follows and, in part, will be apparent from the description, or may be learned by practice of the presented embodiments.

According to one or more exemplary embodiments, there is provided an image processing apparatus which may include: a divider configured to divide a current image into a plurality of blocks; a first calculator configured to calculate a first minimum value, a first maximum value, and a first average value of each block in the current image; a second calculator configured to calculate a first lower average value and a first upper average value of each block in the current image by using the first minimum value, the first maximum value, and the first average value of each corresponding block in a first previous image prior to the current image; a third calculator configured to calculate a reference minimum value, a reference maximum value, a reference average value, a reference lower average value, and a reference upper average value of each block in the current image by using the first minimum value, the first maximum value, and the first average value of each corresponding block in a second previous image prior to the first previous image and the first lower average value and the first upper average value of each corresponding of block in the first previous image; and a corrector configured to generate an output value of each pixel of the current image by using the reference minimum value, the reference maximum value, the reference average value, the reference lower average value, and the reference upper average value of each block in the current image.

The third calculator may be configured to set the first minimum value, the first maximum value, and the first average value of each corresponding block in the second previous image and the first lower average value and the first upper average of each corresponding block in the first previous image as a second minimum value, a second maximum value, a second average value, a second lower average value, and a second upper average value of each block in the current image, respectively, and calculate the reference minimum value, the reference maximum value, the reference average value, the reference lower average value, and the reference upper average value of each block in the current image by performing weighted summation of the second minimum values, the second maximum values, the second average values, the second lower average values, and the second upper average values of each block and neighboring blocks in the current image by using a weight that is inversely proportional to a center distance between each block and the neighboring blocks in the current image.

The corrector may generate the output value of each pixel of the current image by setting an output minimum value, an output maximum value, an output average value, an output lower average value, and an output upper average value respectively corresponding to the reference minimum value, the reference maximum value, the reference average value, the reference lower average value, and the reference upper average value of each block in the current image.

The corrector may be further configured to set a pixel value determined by interpolation of the output minimum value, the output maximum value, the output average value, the output lower average value, and the output upper average value to a pixel whose pixel value is equal to a value between the reference minimum value, the reference maximum value, the reference average value, the reference lower average value, and the reference upper average value of each block in the current image.

The output minimum value, the output maximum value, the output average value, the output lower average value, and the output upper average value may be set according to a gray level of the current image.

The third calculator may be configured to set the first minimum value, the first maximum value, and the first average value of each corresponding block in the second previous image and the first lower average value and the first upper average value of each corresponding block in the first previous image as a second minimum value, a second maximum value, a second average value, a second lower average value, and a second upper average value of each block in the current image, respectively, and calculate the reference minimum value, the reference maximum value, the reference average value, the reference lower average value, and the reference upper average value of each block in the current image by performing weighted summation of the second minimum value, the second maximum value, the second average value, the second lower average value, and the second upper average value of each block in the current image and the second minimum value, the second maximum value, the second average value, a second lower average value, and a second upper average value of each corresponding block in the first previous image.

The third calculator may be configured to set the first minimum value, the first maximum value, and the first average value of each corresponding block in the second previous image, and the first lower average value and the first upper average value of each corresponding block in the first previous image as a second minimum value, a second maximum value, a second average value, a second lower average value, and a second upper average value of each block in the current image, respectively, calculate a third minimum value, a third maximum value, a third average value, a third lower average value, and a third upper average value of each block in the current image by performing weighted summation on the second minimum value, the second maximum value, the second average value, the second lower average value, and the second upper average value of each block in the current image and the second minimum value, the second maximum value, the second average value, the second lower average value, and the second upper average value of each corresponding block in the first previous image, and calculate the reference minimum value, the reference maximum value, the reference average value, the reference lower average value, and the reference upper average value of each block in the current image by performing weighted summation of the third minimum values, the third maximum values, the third average values, the third lower average values, and the third upper average values of each block and neighboring blocks in the current image by using a weight that is inversely proportional to a center distance between each block and neighboring blocks in the current image.

According to one or more exemplary embodiments, there is provided an image processing method which may include: dividing a current image into a plurality of blocks; calculating a first minimum value, a first maximum value, and a first average value of each block in the current image; calculating a first lower average value and a first upper average value of each block in the current image by using the first minimum value, the first maximum value, and the first average value of each corresponding block in a first previous image prior to the current image; calculating a reference minimum value, a reference maximum value, a reference average value, a reference lower average value, and a reference upper average value of each block in the current image by using the first minimum value, the first maximum value, and the first average value of each corresponding block in a second previous image prior to the first previous image and the first lower average value and the first upper average value of each corresponding block in the first previous image; and generating an output value of each pixel of the current image by using the reference minimum value, the reference maximum value, the reference average value, the reference lower average value, and the reference upper average value of each block in the current image.

The calculating the reference values may include: setting the first minimum value, the first maximum value, and the first average value of each corresponding block in the second previous image and the first lower average value and the first upper average value of each corresponding block in the first previous image as a second minimum value, a second maximum value, a second average value, a second lower average value, and a second upper average value of each block in the current image, respectively; and calculating the reference minimum value, the reference maximum value, the reference average value, the reference lower average value, and the reference upper average value of each block in the current image by performing weighted summation of the second minimum values, the second maximum values, the second average values, the second lower average values, and the second upper average values of each block and neighboring blocks in the current image by applying a weight that is inversely proportional to a center distance between each block and the neighboring blocks in the current image.

The generating the output value may include setting an output minimum value, an output maximum value, an output average value, an output lower average value, and an output upper average value respectively corresponding to the reference minimum value, the reference maximum value, the reference average value, the reference lower average value, and the reference upper average value of each block in the current image.

The generating the output value may include setting a pixel value determined by interpolation of the output minimum value, the output maximum value, the output average value, the output lower average value, and the output upper average value to a pixel whose pixel value is between the reference minimum value, the reference maximum value, the reference average value, the reference lower average value, and the reference upper average value of each block in the current image.

The output minimum value, the output maximum value, the output average value, the output lower average value, and the output upper average value may be set according to a gray level of the current image.

The calculating the reference values may include: setting the first minimum value, the first maximum value, and the first average value calculated from each corresponding block of the second previous image and the first lower average value and the first upper average value calculated from each corresponding block of the first previous image as a second minimum value, a second maximum value, a second avera setting the first minimum value, the first maximum value, and the first average value of each corresponding block in the second previous image and the first lower average value and the first upper average value of each corresponding block in the first previous image as a second minimum value, a second maximum value, a second average value, a second lower average value, and a second upper average value of each block in the current image, respectively; and calculating the reference minimum value, the reference maximum value, the reference average value, the reference lower average value, and the reference upper average value of each block in the current image by performing weighed summation of the second minimum value, the second maximum value, the second average value, the second lower average value, and the second upper average value of each block in the current image, and the second minimum value, the second maximum value, the second average value, the second lower average value, and the second upper average value of each corresponding block in the first previous image.ge value, a second lower average value, and a second upper average value of each block of the current image; and calculating the reference minimum value, the reference maximum value, the reference average value, the reference lower average value, and the reference upper average value of each block of the current image by weighed summing the second minimum value, the second maximum value, the second average value, the second lower average value, and the second upper average value calculated from each block of the current image with the second minimum value, the second maximum value, the second average value, the second lower average value, and the second upper average value calculated from each corresponding block of the first previous image.

The calculating the reference values may include: setting the first minimum value, the first maximum value, and the first average value of each corresponding block in the second previous image, and the first lower average value and the first upper average value of each corresponding block in the first previous image as a second minimum value, a second maximum value, a second average value, a second lower average value, and a second upper average value of each block in the current image, respectively; calculating a third minimum value, a third maximum value, a third average value, a third lower average value, and a third upper average value of each block in the current image by performing weighted summation of the second minimum value, the second maximum value, the second average value, the second lower average value, and the second upper average value of each block in the current image, and the second minimum value, the second maximum value, the second average value, the second lower average value, and the second upper average value of each corresponding block in the first previous image; and calculating the reference minimum value, the reference maximum value, the reference average value, the reference lower average value, and the reference upper average value of each block in the current image by performing weighted summation of the third minimum values, the third maximum values, the third average values, the third lower average values, and the third upper average values of each block and neighboring blocks in the current image by using a weight that is inversely proportional to a center distance between each block and the neighboring blocks in the current image.

According to one or more exemplary embodiments, there is provided an image processing apparatus which may include: a divider configured to divide an image into a plurality of blocks; a first calculator configured to calculate a minimum value, a maximum value, and an average value of each block in a first image; a second calculator configured to calculate a lower average value and an upper average value of each block in a second image subsequent to the first image, the lower average value being a pixel value average of pixels between the minimum value and the average value of a corresponding block in the first image, and the upper average value being a pixel value average of pixels between the maximum value and the average value of the corresponding block in the first image; a third calculator configured to calculate a reference minimum value, a reference maximum value, a reference average value, a reference lower average value, and a reference upper average value of each block in a third image subsequent to the second image by using the minimum value, the maximum value, and the average value of the corresponding block in the first image and the lower average value and the upper average value of a corresponding block in the second image; and a corrector configured to generate an output value obtained by correcting pixel values of pixels of each block in the third image, based on the reference minimum value, the reference maximum value, the reference average value, the reference lower average value, and the reference upper average value of each block in the third image.

The third calculator may be configured to set a first minimum value, a first maximum value, and a first average value of each corresponding block in the first image, and a first lower average value and a first upper average value of each corresponding block in the second image as a second minimum value, a second maximum value, a second average value, a second lower average value, and a second upper average value of each block in the third image, respectively, and calculate the reference minimum value, the reference maximum value, the reference average value, the reference lower average value, and the reference upper average value of each block in the third image by performing weighted summation of the second minimum values, the second maximum values, the second average values, the second lower average values, and the second upper average values of each block and neighboring blocks in the third image by using a weight that is inversely proportional to a center distance between each block and the neighboring blocks of the third image.

The corrector may be configured to set an output minimum value, an output maximum value, an output average value, an output lower average value, and an output upper average value respectively corresponding to the reference minimum value, the reference maximum value, the reference average value, the reference lower average value, and the reference upper average value of each block in the third image.

The output minimum value, the output maximum value, the output average value, the output lower average value, and the output upper average value may be set according to a gray level of the third image.

The third calculator may be configured to set a first minimum value, a first maximum value, and a first average value of each corresponding block in the first image, and a first lower average value and a first upper average value of each corresponding block in the second image as a second minimum value, a second maximum value, a second average value, a second lower average value, and a second upper average value of each block in the third image, respectively, and calculate the reference minimum value, the reference maximum vale, the reference average value, the reference lower average value, and the reference upper average value of each block in the third image by performing weighted summation of the second minimum value, the second maximum value, the second average value, the second lower average value, and the second upper average value of each block in the third image and the second minimum value, the second maximum value, the second average value, the second lower average value, and the second upper average value of each corresponding block in the second image.

The third calculator may be configured to set a first minimum value, a first maximum value, and a first average value of each corresponding block in the first image, and a first lower average value and a first upper average value of each corresponding block in the second image as a second minimum value, a second maximum value, a second average value, a second lower average value, and a second upper average value of each block in the third image, respectively, calculate a third minimum value, a third maximum value, a third average value, a third lower average value, and a third upper average value of each block in the third image by weighted summation of the second minimum value, the second maximum value, the second average value, the second lower average value, and the second upper average value of each block in the third image, and the second minimum value, the second maximum value, the second average value, the second lower average value, and the second upper average value of each corresponding block in the second image, and calculate the reference minimum value, the reference maximum value, the reference average value, the reference lower average value, and the reference upper average value of each block in the third image by performing weighted summation of the third minimum values, the third maximum values, the third average values, the third lower average values, and the third upper average values of each block and neighboring blocks in the third image by using a weight that is inversely proportional to a center distance between each block and the neighboring blocks in the third image.

According to one or more exemplary embodiments, a computer-readable recording medium having embodied thereon a program for executing an image processing method in a computer may be provided.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
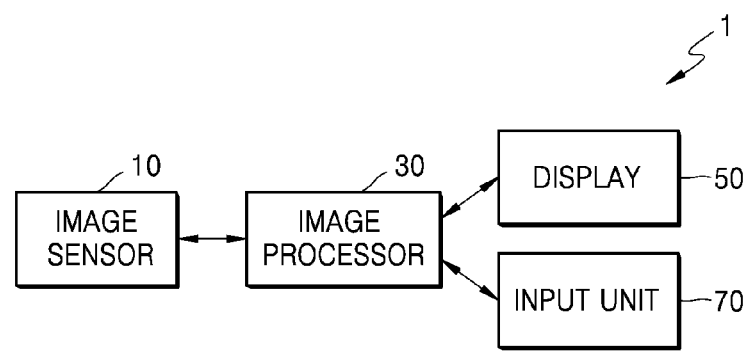
FIG. 1 is a block diagram of an image processing apparatus according to an embodiment.

All embodiments described herein are exemplary illustrating the principles of the inventive concept without being limited thereto. It will thus be appreciated that one of ordinary skill in the art will be able to devise various arrangements which, although not explicitly described or shown herein, embody the principles of the inventive concept and are included within its spirit and scope. Furthermore, all examples and conditional language recited herein are principally intended expressly to be only for pedagogical purposes and to aid the reader in understanding the principles of the inventive concept, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

At least one of the components, elements, modules or units (collectively "components" in this paragraph) represented by a block in the drawings may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The objectives, features, and advantages of the inventive concept will be described more fully with reference to the accompanying drawings, in which exemplary embodiments are shown. In the description of these embodiments, certain detailed explanations of the related art are omitted when it is deemed that they may unnecessarily obscure the essence of the inventive concept.

FIG. 1 is a block diagram of an image processing apparatus 1 according to an embodiment. Referring to FIG. 1, the image processing apparatus 1 may include an image sensor 10, an image processor 30, a display 50, and an input interface 70.

The image processing apparatus 1 may be any of various apparatuses such as a surveillance camera including a specific-purpose camera, a visual camera, a thermal camera, a wireless communication device, a personal digital assistant (PDA), a lap-top computer, a desk-top computer, a camcorder, a digital camera, a closed-circuit television (CCTV), an action camera, a digital recording device, a network-enabled digital television, a mobile phone, a cellular phone, a satellite telephone, a camera phone, and a two-way communication device. Alternatively, at least one of the image sensor 10, the image processor 30, the display 50, and the input interface 70 may be separately provided, and the image processing apparatus 1 may be an image processing system connected to the at least one device by wire or wirelessly and transmitting/receiving data.

The image sensor 10 may include a photoelectric conversion device such as a charge-coupled device (CCD) or a complementary metal-oxide semiconductor (CMOS). The image sensor 10 obtains image information by capturing an image of a forward scene. A lens (not shown) that receives an optical signal may be provided on a front end of the image sensor 10.

The image processor 30 may include a various number of hardware or/and software components that perform specific functions. For example, the image processor 30 may refer to a data processing device embedded in hardware and having a circuit physically structured to execute, for example, code or a command included in a program. As such, examples of the data processing device embedded in the hardware may include, but are not limited to, a microprocessor, a CPU, a processor core, a multiprocessor, an application-specific integrated circuit (ASIC), and a field-programmable gate array (FPGA).

The image processor 30 may reduce noise of an image frame, and perform signal processing for improving image quality such as gamma correction, color filter array interpolation, color matrix, color correction, or color enhancement.

The image processor 30 may correct an image by analyzing luminance (brightness) of an image input from the image sensor 10. The image processor 30 may perform correction for enhancing contrast by making luminance distribution of the input image uniform. The image sensor 10 provided outside may be exposed to strong light, rain, snow, dust, smoke, mist, or smog, and fail to obtain detailed information about a scene due to degradation of the obtained image. The image processor 30 may overcome image degradation due to an environmental condition by enhancing contrast.

The image processor 30 may generate an output image having enhanced contrast by dividing an input image into a plurality of blocks and calculating an output value of pixels in units of blocks by using a minimum value, a maximum value, an average value, a lower average value, and an upper average value of luminance of each block. The lower average value is an average of pixel values between the minimum value and the average value. The upper average value is an average of pixel values between the average value and the maximum value.

The display 50 may be connected to the image processor 30 by wire or wirelessly, may perform signal processing on an image output from the image processor 30, and may output the signal-processed image to a user. The display 50 may be a liquid-crystal display (LCD) panel, an organic light-emitting display (OLED) panel, or an electrophoretic display (EPD) panel. The display 50 may be provided as a touchscreen to receive an input through the user's touch, and may operate as a user input interface.

The input interface 70 is connected to the image processor 30 by wire or wirelessly, and generates input data for controlling the image processor 30. The input interface 70 may include a keypad, a dome switch, a touchpad (e.g., a touchpad using a contact-type capacitive method, a pressure-type resistive film method, an infrared detection method, a surface ultrasonic conduction method, an integral-type tension measurement method, or a piezoelectric effect method), a mouse, a remote controller, a jog wheel, or a jog switch. The user may input parameters for image correction by using the input interface 70.

Figure 2:
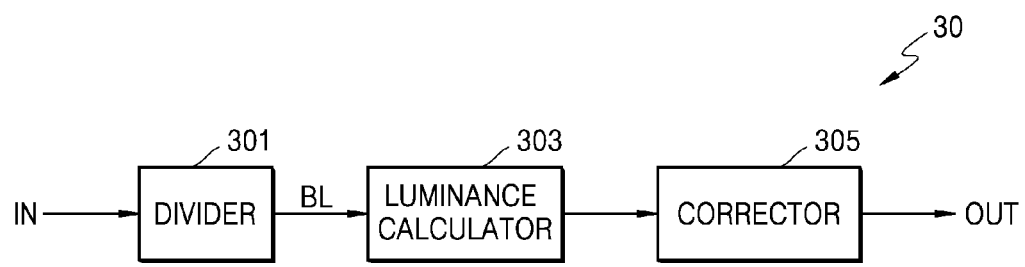
FIG. 2 is a block diagram illustrating a configuration of an image processor according to an embodiment.

FIG. 2 is a block diagram illustrating a configuration of the image processor 30 according to an embodiment.

Referring to FIG. 2, the image processor 30 may include a divider 301, a luminance calculator 303, and a corrector 305. The image processor 30 may transmit an image input in units of frames to the divider 301.

The divider 301 may divide an input image IN into a plurality of blocks BL. Each block may have a size of N×M (N≥1 and M≥1). For example, the divider 301 may divide an image having a resolution of 1920×1088 into 30×17 blocks having a size of 64×64.

An image may include information about a plurality of pixels arranged in rows and columns. A pixel may have a component defined in a color space. Examples of a color space may include an RGB color space, a YUV color space, and a YCbCr color space, and the present embodiment is not limited to the above color spaces and may be applied to any of various color spaces. A pixel value of a pixel may be represented by a luminance value that is a component in a color space. A luminance value may be a value in a dynamic range of gray levels determined by the number of bits of image data. For example, a pixel value of an 8-bit image may be one of 256 (0 to 255) levels, and a pixel value of a 12-bit image may be one of 4096 (0 to 4095) levels.

The luminance calculator 303 may calculate a reference minimum value MINr, a reference maximum value MAXr, a reference average value MMr, a reference lower average value LMr, and a reference upper average value HMr by analyzing pixel values in units of blocks in the input image IN. The luminance calculator 303 will be described below in detail.

The corrector 305 may generate an output image OUT in which pixel values of pixels are corrected, by using the reference minimum value MINr, the reference maximum value MAXr, the reference average value MMr, the reference lower average value LMr, and the reference upper average value HMr in units of blocks of the input image IN. The corrector 305 may enhance contrast by correcting pixel values of the input image IN in units of blocks by using a lookup table LUT showing a mapping relationship between an input value PIN of a pixel and an output value POUT of the pixel.

Figure 3:
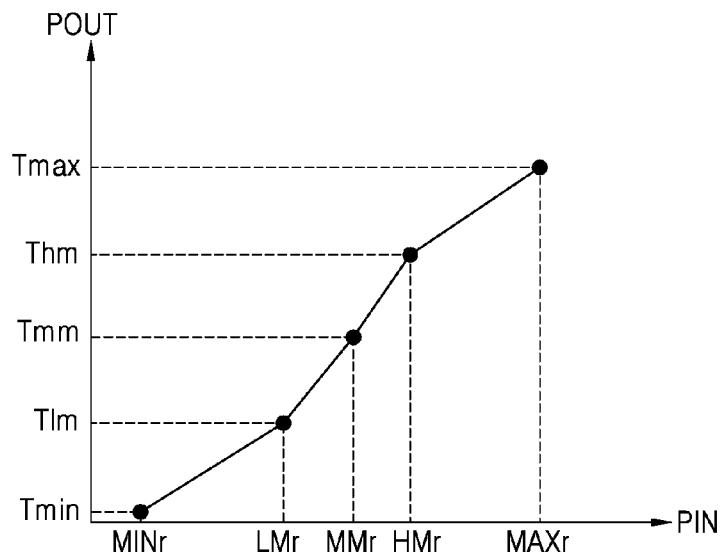
FIG. 3 is a graph corresponding to a lookup table for showing a corresponding relationship between an input value of a pixel and an output value of the pixel according to an embodiment.

FIG. 3 is a graph corresponding to a lookup table for showing a corresponding relationship between the input value PIN of a pixel and the output value POUT of the pixel according to an embodiment.

The corrector 305 may set an output minimum value Tmin, an output maximum value Tmax, an output average value Tmm, an output lower average value Tlm, and an output upper average value Thm respectively corresponding to the reference minimum value MINr, the reference maximum value MAXr, the reference average value MMr, the reference lower average value LMr, and the reference upper average value HMr calculated for each block BL of the input image IN.

The corrector 305 may calculate a primary output value T' via Equation 1, and then, calculate a final output value T by using the primary output value T' via Equation 2. In this case, a primary output value T'mm of the reference average value MMr may be first calculated, and then, primary output values T'min, T'max, T'lm, and T'hm of the reference minimum value MINr, the reference maximum value MAXr, the reference lower average value LMr, and the reference upper average value HMr may be calculated by using the primary output value T'mm. Also, tgt_shift is a parameter for adjusting whether to maintain a global contrast of the input image IN or perform contrast correction, and lgc is a parameter for adjusting a contrast correction intensity.

$$T'mm=(1-tgt\_shift)\times128+(tgt\_shift)\times MMr$$

When T'mm>128, $$T'max=255$$

$$T'hm=(255+T'mm)/2$$

$$T'lm=T'mm-64$$

$$T'min=T'mm-128.$$

However, when T'mm≤128, $$T'max=T'mm+127$$

$$T'hm=T'mm+64$$

$$T'lm=T'mm/2$$

$$T'min=0 \quad (1)$$

$$Tmax=T'max\times lgc+MAXr\times(1-lgc)$$

$$Thm=T'hm\times lgc+HMr\times(1-lgc)$$

$$Tmm=T'mm\times lgc+MMr\times(1-lgc)$$

$$Tlm=T'lm\times lgc+LMr\times(1-lgc)$$

$$Tmin=T'min\times lgc+MINr\times(1-lgc) \quad (2)$$

In an embodiment, when tgt_shift and lgc are both set to 1, output values may be set: Tmax=255, Thm=192, Tmm=128, Tlm=64, and Tmin=0.

Equations 1 and 2 are equations when a grayscale provides 256 gray levels, and may be similarly used even when the grayscale provides other gray levels.

The corrector 305 may set the output minimum value Tmin to pixels whose pixel values are equal to or less than the reference minimum value MINr, for each block BL of the input image IN. The corrector 305 may set the output maximum value Tmax to pixels whose pixel values are equal to or greater than the reference maximum value MAXr, for each block BL of the input image IN. The corrector 305 may set the output average value Tmm, the output lower average value Tlm, and the output upper average value Thm to pixels whose pixel values are respectively the reference average value MMr, the reference lower average value LMr, and the reference upper average value HMr, for each block BL of the input image IN. The corrector 305 may set an output value calculated by interpolation of the output minimum value Tmin and the output lower average value Tlm to pixels whose pixel values are between the reference minimum value MINr and the reference lower average value LMr, for each block BL of the input image IN. The corrector 305 may set an output value calculated by interpolation of the output lower average value Tlm and the output average value Tmm to pixels whose pixel values are between the reference lower average value LMr and the reference average value MMR, for each block BL of the input image IN. The corrector 305 may set an output value calculated by interpolation of the output average value Tmm and the output upper average value Thm to pixels whose pixel values are between the reference average value MMr and the reference upper average value HMr, for each block BL of the input image IN. The corrector 305 may set an output value calculated by interpolation of the output upper average value Thm and the output maximum value Tmax to pixels whose pixel values are between the reference upper average value HMr and the reference maximum value MAXr, for each block BL of the input image IN.

If only three values such as a minimum value, an average value, and a maximum value are used to enhance contrast, contrast enhancement effect may not be achieved sometimes. For example, in a 256-level image where a minimum value is 0, a maximum value is 255, and an average value is 128 due to noise or the like, if an output minimum value, an output maximum value, and an output average value are respectively 0, 255, and 128, an input image and an output image are the same.

The embodiment of the inventive concept further uses a lower average value and an upper average value in addition to a minimum value, an average value, and a maximum value of each block in order to enhance contrast. The lower average value is calculated based on pixel values of pixels less than the average value, and the upper average value is calculated based on pixel values of pixels greater than the average value. For example, an output lower average value and an output upper average value may be respectively set to 64 that is an intermediate value between 0 and 128 and 192 that is an intermediate value between 128 and 255, and pixel value correction may be performed by linearly mapping values between the two values through interpolation. As such, the inventive concept may achieve excellent contrast enhancement effect by using a lower average value and an upper average value.

Figure 4:
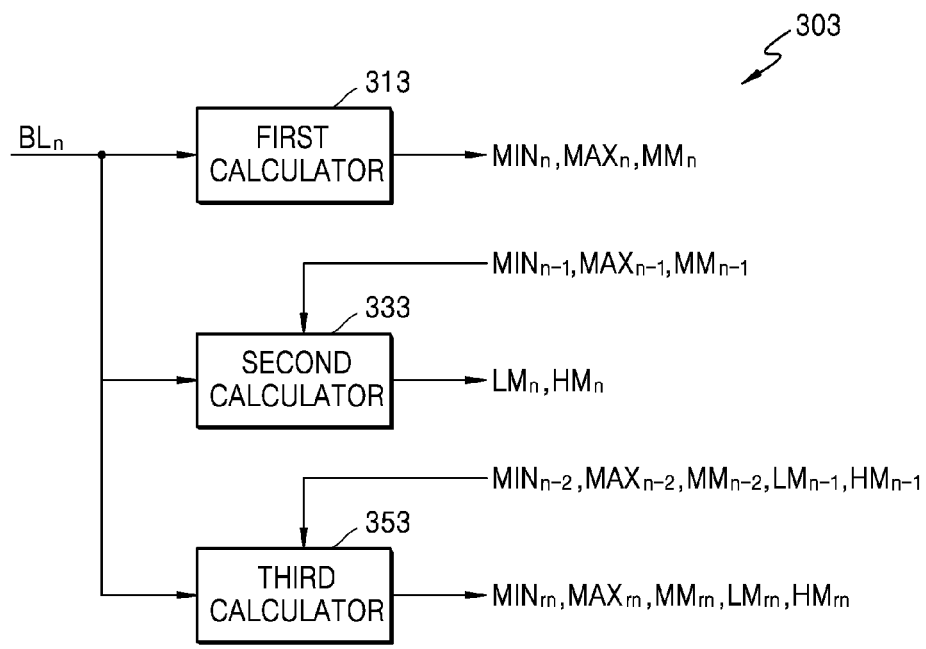
FIG. 4 is a block diagram of a luminance calculator of FIG. 2.
Figure 5:
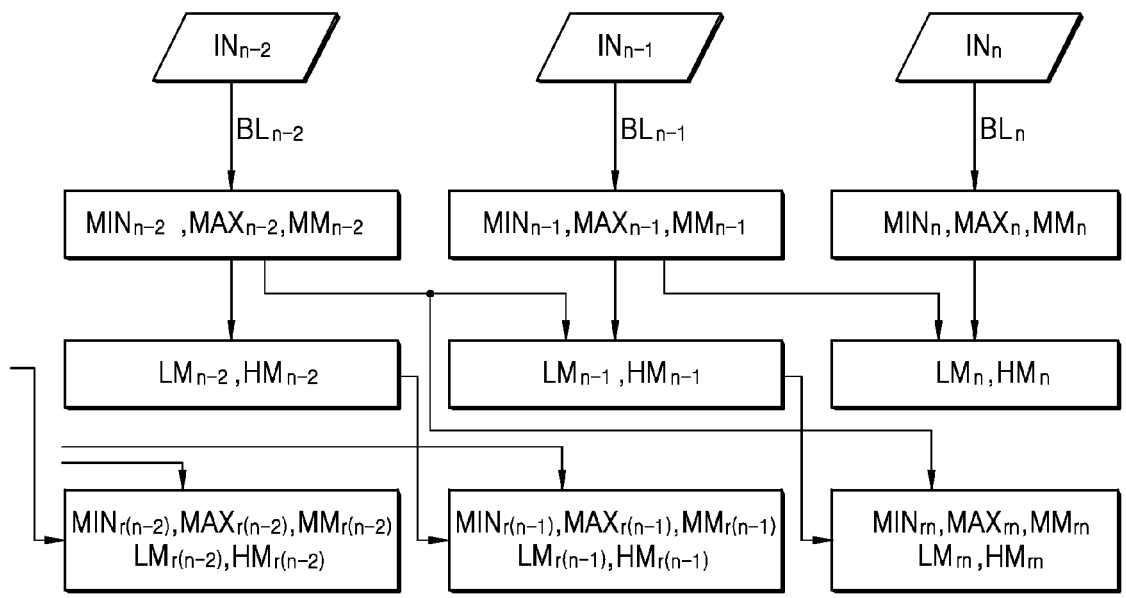
FIG. 5 is a diagram for further describing the block diagram of FIG. 4.

FIG. 4 is a block diagram of the luminance calculator 303 of FIG. 2. FIG. 5 is a diagram for further describing the block diagram of FIG. 4.

Referring to FIGS. 4 and 5, the luminance calculator 303 may include a first calculator 313, a second calculator 333, and a third calculator 353. For convenience of explanation, a current input image $IN_n$ is referred to as a 'current image', a previous image $IN_{n-1}$ prior to the current image $IN_n$ is referred to as a 'first previous image', and a previous image $IN_{n-2}$ prior to the first previous image $IN_{n-1}$ is referred to as a 'second previous image'. Also, since the luminance calculator 303 calculates a value in units of blocks, the description will focus on a block whose value is to be calculated (hereinafter, referred to as a 'current block') $BL_n$ from the current image $IN_n$. Blocks corresponding to the current block $BL_n$ of the current image $IN_n$ are referred to as a corresponding block $BL_{n-1}$ in the first previous image $IN_{n-1}$ and a corresponding block $BL_{n-2}$ in the second previous image $IN_{n-2}$.

The first calculator 313 may calculate a first minimum value $MIN_n$, a first maximum value $MAX_n$, and a first average value $MM_n$ from the current block $BL_n$ of the current image $IN_n$. The first calculator 313 may set a minimum value and a maximum value from among pixel values of pixels included in the current block $BL_n$ of the current image $IN_n$ as the first minimum value $MIN_n$ and the first maximum value $MAX_n$ of the current block $BL_n$ of the current image $IN_n$. The first calculator 303 may set an average of the pixel values of the pixels included in the current block $BL_n$ of the current image $IN_n$ as the first average value $MM_n$ of the current block $BL_n$ of the current image $IN_n$.

The second calculator 333 may calculate a first lower average value $LM_n$ and a first upper average value $HM_n$ of the current block $BL_n$ of the current image $IN_n$. The second calculator 333 may calculate the first lower average value $LM_n$ and the first upper average value $HM_n$ of the current block $BL_n$ of the current image $IN_n$ by using a first minimum value $MIN_{n-1}$, a first maximum value $MAX_{n-1}$, and a first average value $MM_{n-1}$ of the corresponding block $BL_{n-1}$ in the first previous image $IN_{n-1}$. The second calculator 333 may calculate the first lower average value $LM_n$ that is an average of pixel values between the first minimum value $MIN_{n-1}$ and the first average value $MM_{n-1}$ calculated from the corresponding block $BL_{n-1}$ in the first previous image $IN_{n-1}$, from the current block $BL_n$ of the current image $IN_n$. The second calculator 333 may calculate the first upper average value $HM_n$ that is an average of pixel values between the first average value $MM_{n-1}$ and the first maximum value $MAX_{n-1}$ calculated from the corresponding block $BL_{n-1}$ in the first previous image $IN_{n-1}$, from the current block $BL_n$ of the current image $IN_n$.

The third calculator 353 may calculate a reference minimum value $MIN_{rm}$, a reference maximum value $MAX_{rm}$, a reference average value $MM_{rm}$, a reference lower average value $LM_{rm}$, and a reference upper average value $HM_{rm}$ of the current block $BL_n$ of the current image $IN_n$ by using a first minimum value $MIN_{n-2}$, a first maximum value $MAX_{n-2}$, and a first average value $MM_{n-2}$ of the corresponding block $BL_{n-2}$ in the second previous image $IN_{n-2}$ and a first lower average value $LM_{n-1}$ and a first upper average value $HM_{n-1}$ of the corresponding block $BL_{n-1}$ in the first previous image $IN_{n-1}$.

Here, the first minimum value $MIN_{n-1}$, the first maximum value $MAX_{n-1}$, and the first average value $MM_{n-1}$ of the corresponding block $BL_{n-1}$ in the first previous image $IN_{n-1}$ may be calculated in the same manner as the first minimum value $MIN_n$, the first maximum value $MAX_n$, and the first average value $MM_n$ of the current block $BL_n$ of the current image $IN_n$. In addition, the first lower average value $LM_{n-1}$ and the first upper average value $HM_{n-1}$ of the corresponding block $BL_{n-1}$ in the first previous image $IN_{n-1}$ may be calculated in the same manner as the first lower average value $LM_n$ and the first upper average value $HM_n$ of the current block $BL_n$ of the current image $IN_n$.

The third calculator 353 may respectively set the first minimum value $MIN_{n-2}$, the first maximum value $MAX_{n-2}$, and the first average value $MM_{n-2}$ of the corresponding block $BL_{n-2}$ in the second previous image $IN_{n-2}$ and the first lower average value $LM_{n-1}$ and the first upper average value $HM_{n-1}$ of the corresponding block $BL_{n-1}$ in the first previous image $IN_{n-1}$ as a second minimum value $MIN_n'$, a second maximum value $MAX_n'$, a second average value $MM_n'$, a second lower average value $LM_n'$, and a second upper average value $HM_n'$ of the current block $BL_n$ of the current image $IN_n$.

In an embodiment, the third calculator 353 may calculate a reference value by performing block-based spatial weighted summation in the current image $IN_n$. A boundary between blocks may be prevented from being viewed due to the block-based spatial weighted summation.

The third calculator 353 may select one or more neighboring blocks $BL_{nn}$ surrounding the current block $BL_n$ of the current image $IN_n$. The third calculator 353 may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of the current block $BL_n$ by using the second minimum value $MIN_n'$, the second maximum value $MAX_n'$, the second average value $MM_n'$, the second lower average value $LM_n'$, and the second upper average value $HM_n'$ of the neighboring blocks $BL_{nn}$, which may be obtained in the same manner as the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$, respectively.

The third calculator 353 may apply a first weight to the second minimum value $MIN_n'$, the second maximum value $MAX_n'$, the second average value $MM_n'$, the second lower average value $LM_n'$, and the second upper average value $HM_n'$ of the neighboring blocks $BL_{nn}$. In this case, the first weight may be set to vary according to a center distance between a center of the current block $BL_n$ and a center of the neighboring blocks $BL_{nn}$. The third calculator 353 may apply a highest first weight to the current block $BL_n$, and may apply a first weight that is inversely proportional to the center distance to the neighboring blocks $BL_{nn}$.

The third calculator 353 may calculate the reference minimum value $MIN_{rn}$ of the current block $BL_n$ by performing weighted summation by applying the first weight to the second minimum value $MIN_n'$ of the current block $BL_n$ and the second minimum values $MIN_n'$ of the neighboring blocks $BL_{nn}$. The third calculator 353 may calculate the reference maximum value $MAX_{rn}$ of the current block $BL_n$ by performing weighted summation by applying the first weight to the second maximum value $MAX_n'$ of the current block $BL_n$ and the second maximum values $MAX_n'$ of the neighboring blocks $BL_{nn}$. The third calculator 353 may calculate the reference average value $MM_{rn}$ of the current block $BL_n$ by performing weighted summation by applying the first weight to the second average value $MM_n'$ of the current block $BL_n$ and the second average values $MM_n'$ of the neighboring blocks $BL_{nn}$. The third calculator 353 may calculate the reference lower average value $LM_{rn}$ of the current block $BL_n$ by performing weighted summation by applying the first weight to the second lower average value $LM_n'$ of the current block $BL_n$ and the second lower average values $LM_n'$ of the neighboring blocks $BL_{nn}$. The third calculator 353 may calculate the reference upper average value $HM_{rn}$ of the current block $BL_n$ by performing weighted summation by applying the first weight to the second upper average value $HM_n'$ of the current block $BL_n$ and the second upper average values $HM_n'$ of the neighboring blocks $BL_{nn}$. The third calculator 353 may use weighted summation of second values between k×k blocks having the current block $BL_n$ as a center block.

Figure 6:
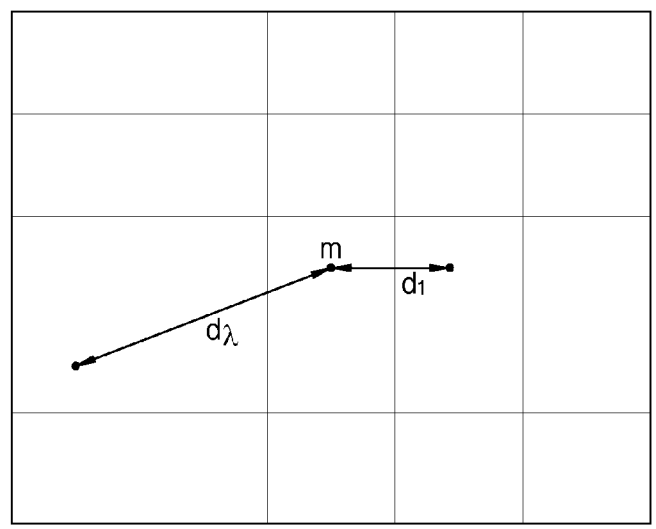
FIG. 6 is a graph for explaining an operation of a third calculator according to an embodiment.

FIG. 6 is a graph for explaining an operation of the third calculator 353 according to an embodiment. Referring to FIG. 6, a reference value may be calculated by using spatial weighted summation between an $m^{th}$ block located at the center of 5×5 blocks and 24 neighboring blocks surrounding the $m^{th}$ block. A first weight that is inversely proportional to a center distance $(d_1, \ldots, d_i, \ldots, d_{24})$ between the $m^{th}$ block and the 24 neighboring blocks may be applied to the neighboring blocks. A highest first weight may be applied to the $m^{th}$ block.

Although a center distance between the current block $BL_n$ and the neighboring blocks $BL_{nn}$ is used in the above embodiment, the inventive concept is not limited thereto. For example, a reference value of the current block $BL_n$ may be calculated by applying a first weight that is inversely proportional to a distance between centers of each pixel of the current block $BL_n$ and the neighboring blocks $BL_{nn}$ to the current block $BL_n$ and the neighboring blocks $BL_{nn}$ and obtaining an average of weighted summation values calculated for pixels of the current block $BL_n$.

In another embodiment, the third calculator 353 may calculate a reference value by using block-based temporal weighted summation of the current image $IN_n$ and the first previous image $IN_{n-1}$. Image flickering may be prevented due to the block-based temporal weighted summation.

The third calculator 353 may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of the current image $IN_n$ by performing alpha blending on second values of corresponding blocks of the current image $IN_n$ and the first previous image $IN_{n-1}$. An alpha value $\alpha$ used in the alpha blending may refer to a combining ratio between the current image $IN_n$ and the first previous image $IN_{n-1}$, and may be a second weight of the current block $BL_n$ of the current image $IN_n$. A second weight applied to the corresponding block $BL_{n-1}$ in the first previous image $IN_{n-1}$ may be $1-\alpha$. As the alpha value $\alpha$ increases, image data of the current image $IN_n$ is more reflected than image data of the first previous image $IN_{n-1}$.

The third calculator 353 may calculate the reference minimum value $MIN_{rn}$ of the current block $BL_n$ of the current image $IN_n$ by performing weighted summation by applying the second weight to the second minimum value $MIN_n'$ of the current block $BL_n$ of the current image $IN_n$ and a second minimum value $MIN_{n-1}'$ of the corresponding block $BL_{n-1}$ in the first previous image $IN_{n-1}$. The third calculator 353 may calculate the reference maximum value $MAX_{rn}$ of the current block $BL_n$ of the current image $IN_n$ by performing weighted summation by applying the second weight to the second maximum value $MAX_n'$ of the current block $BL_n$ of the current image $IN_n$ and a second maximum value $MAX_{n-1}'$ of the corresponding block $BL_{n-1}$ in the first previous image $IN_{n-1}$. The third calculator 353 may calculate the reference average value $MM_{rn}$ of the current block $BL_n$ of the current image $IN_n$ by performing weighted summation by applying the second weight to the second average value $MM_n'$ of the current block $BL_n$ of the current image $IN_n$ and a second average value $MM_{n-1}'$ of the corresponding block $BL_{n-1}$ in the first previous image $IN_{n-1}$. The third calculator 353 may calculate the reference lower average value $LM_{rn}$ of the current block $BL_n$ of the current image $IN_n$ by performing weighted summation by applying the second weight to the second lower average value $LM_n'$ of the current block $BL_n$ of the current image $IN_n$ and a second lower average value $LM_{n-1}'$ of the corresponding block $BL_{n-1}$ in the first previous image $IN_{n-1}$. The third calculator 353 may calculate the reference upper average value $HM_{rn}$ of the current block $BL_n$ of the current image $IN_n$ by performing weighted summation by applying the second weight to the second upper average value $HM_n'$ of the current block $BL_n$ of the current image $IN_n$ and a second upper average value $HM_{n-1}'$ of the corresponding block $BL_{n-1}$ in the first previous image $IN_{n-1}$. Here, the second minimum value $MIN_{n-1}'$, the second maximum value $MAX_{n-1}'$, the second average value $MM_{n-1}'$, the second lower average value $LM_{n-1}'$, and the second upper average value $HM_{n-1}'$ of the corresponding block $BL_{n-1}$ in the first previous image $IN_{n-1}$ may be obtained in the same manner as the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$, respectively.

The third calculator 353 may use a reference minimum value $MIN_{r(n-1)}$, a reference maximum value $MAX_{r(n-1)}$, a reference average value $MM_{r(n-1)}$, a reference lower average value $LM_{r(n-1)}$, and a reference upper average value $HM_{r(n-1)}$ of the corresponding block $BL_{n-1}$ in the first previous image $IN_{n-1}$, instead of the second minimum value $MIN_{n-1}'$, the second maximum value $MAX_{n-1}'$, the second average value $MM_{n-1}'$, the second lower average value $LM_{n-1}'$, and the second upper average value $HM_{n-1}'$ of the corresponding block $BL_{n-1}$ in the first previous image $IN_{n-1}$.

In another embodiment, the third calculator 353 may calculate a reference value by using block-based temporal weighted summation of the current image $IN_n$ and the first previous image $IN_{n-1}$ and block-based spatial weighted summation of the current image $IN_n$.

The third calculator 353 may calculate a third minimum value $MIN_n''$, a third maximum value $MAX_n''$, a third average value $MM_n''$, a third lower average value $LM_n''$, and a third upper average value $HM_n''$ of the current block $BL_n$ of the current image $IN_n$ by applying the second weight to corresponding blocks of the current image $IN_n$ and the first previous image $IN_{n-1}$.

The third calculator 353 may calculate the third minimum value $MIN_n''$ of the current block $BL_n$ of the current image $IN_n$ by performing weighted summation by applying the second weight to the second minimum value $MIN_n'$ of the current block $BL_n$ of the current image $IN_n$ and the second minimum value $MIN_{n-1}'$ of the corresponding block $BL_{n-1}$ in the first previous image $IN_{n-1}$. The third calculator may calculate the third maximum value $MAX_n''$ of the current block $BL_n$ of the current image $IN_n$ by performing weighted summation by applying the second weight to the second maximum value $MAX_n'$ of the current block $BL_n$ of the current image $IN_n$ and the second maximum value $MAX_{n-1}'$ of the corresponding block $BL_{n-1}$ in the first previous image $IN_{n-1}$. The third calculator 353 may calculate the third average value $MM_n''$ of the current block $BL_n$ of the current image $IN_n$ by performing weighted summation by applying the second weight to the second average value $MM_n'$ of the current block $BL_n$ of the current image $IN_n$ and the second average value $MM_{n-1}'$ of the corresponding block $BL_{n-1}$ in the first previous image $IN_{n-1}$. The third calculator 353 may calculate the third lower average value $LM_n''$ of the current block $BL_n$ of the current image $IN_n$ by performing weighted summation by applying the second weight to the second lower average value $LM_n'$ of the current block $BL_n$ of the current image $IN_n$ and the second lower average value $LM_{n-1}'$ of the corresponding block $BL_{n-1}$ in the first previous image $IN_{n-1}$. The third calculator 353 may calculate the third upper average value $HM_n''$ of the current block $BL_n$ of the current image $IN_n$ by performing weighted summation by applying the second weight to the second upper average value $HM_n'$ of the current block $BL_n$ of the current image $IN_n$ and the second upper average value $HM_{n-1}'$ of the corresponding block $BL_{n-1}$ in the first previous image $IN_{n-1}$.

The third calculator 353 may use the reference minimum value $MIN_{r(n-1)}$, the reference maximum value $MAX_{r(n-1)}$, the reference average value $MM_{r(n-1)}$, the reference lower average value $LM_{r(n-1)}$, and the reference upper average value $HM_{r(n-1)}$ of the corresponding block $BL_{n-1}$ in the first previous image $IN_{n-1}$, instead of the second minimum value $MIN_{n-1}'$, the second maximum value $MAX_{n-1}'$, the second average value $MM_{n-1}'$, the second lower average value $LM_{n-1}'$, and the second upper average value $HM_{n-1}'$ of the corresponding block $BL_{n-1}$ in the first previous image $IN_{n-1}$.

The third calculator 353 may calculate the reference minimum value $MIN_{rn}$ of the current block $BL_n$ of the current image $IN_n$ by performing weighted summation by applying the first weight to the third minimum value $MIN_n''$ of the current block $BL_n$ and the third minimum values $MIN_n''$ of the neighboring blocks $BL_{nn}$. The third calculator 353 may calculate the reference maximum value $MAX_{rn}$ of the current block $BL_n$ of the current image $IN_n$ by performing weighted summation by applying the first weight to the third maximum value $MAX_n''$ of the current block $BL_n$ and the third maximum values $MAX_n''$ of the neighboring blocks $BL_{nn}$. The third calculator 353 may calculate the reference average value $MM_{rn}$ of the current block $BL_n$ of the current image $IN_n$ by performing weighted summation by applying the first weight to the third average value $MM_n''$ of the current block $BL_n$ and the third average values $MM_n''$ of the neighboring blocks $BL_{nn}$. The third calculator 353 may calculate the reference lower average value $LM_{rn}$ of the current block $BL_n$ of the current image $IN_n$ by performing weighted summation by applying the first weight to the third lower average value $LM_n''$ of the current block $BL_n$ and the third lower average values $LM_n''$ of the neighboring blocks $BL_{nn}$. The third calculator 353 may calculate the reference upper average value $HM_{rn}$ of the current block $BL_n$ of the current image $IN_n$ by performing weighted summation by applying the first weight to the third upper average value $HM_n''$ of the current block $BL_n$ and the third upper average values $HM_n''$ of the neighboring blocks $BL_{nn}$. Here, the third minimum value $MIN_n''$, the third maximum value $MAX_n''$, the third average value $MM_n''$, the third lower average value $LM_n''$, and the third upper average value $HM_n''$ of the corresponding block $BL_{n-1}$ in the neighboring blocks may be obtained in the same manner as the minimum value $MIN_n''$, the third maximum value $MAX_n''$, the third average value $MM_n''$, the third lower average value $LM_n''$, and the third upper average value $HM_n''$ of the current block $BL_n$, respectively.

FIGS. 7 through 11 are diagrams for explaining an image processing method according to an embodiment. The image processing method of FIGS. 7 through 11 may be performed by the image processor 30. The description that is the same as that made above will not be repeated.

Figure 7:
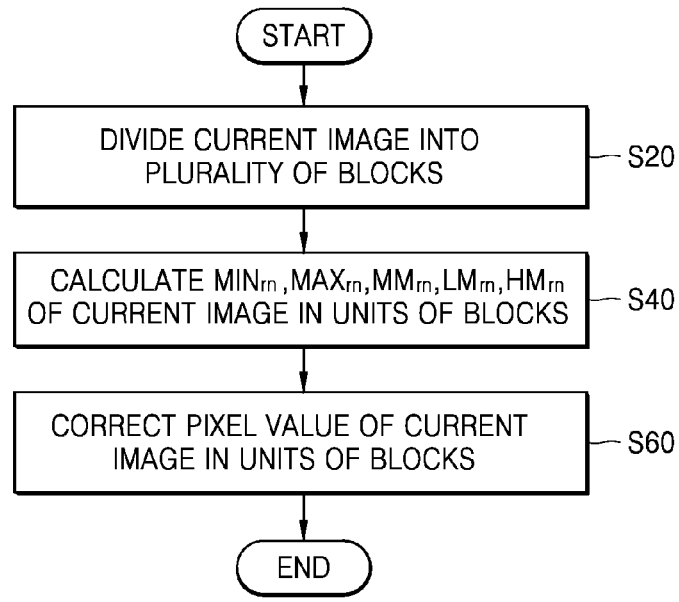
FIGS. 7 through 11 are diagrams for explaining an image processing method according to an embodiment.

Referring to FIG. 7, in operation S20, the image processor 30 may divide a current image that is input into a plurality of blocks.

In operation S40, the image processor 30 may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of the current image.

Figure 8:
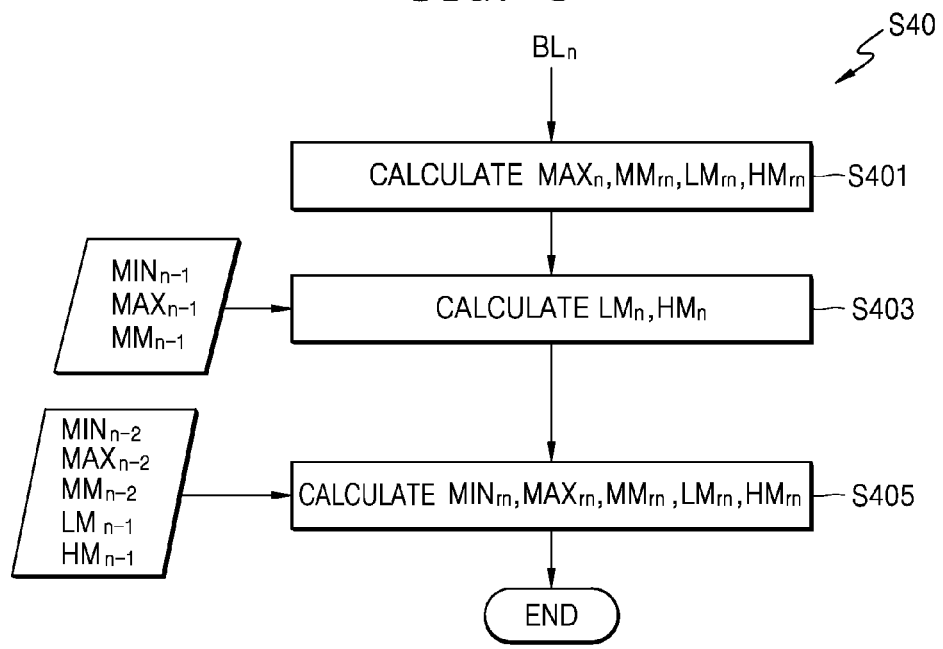

Referring also to FIG. 8, in operation S401, the image processor 30 may calculate the first minimum value $MIN_n$, the first maximum value $MAX_n$, and the first average value $MM_n$ of the current block $BL_n$ of the current image $IN_n$.

In operation S403, the image processor 30 may calculate the first lower average value $LM_n$ and the first upper average value $HM_n$ of the current block $BL_n$ of the current image $IN_n$ by using the first minimum value $MIN_{n-1}$, the first maximum value $MAX_{n-1}$, and the first average value $MM_{n-1}$ of the corresponding block $BL_{n-1}$ in the first previous image $IN_{n-1}$ corresponding to the current block $BL_n$ of the current image $IN_n$.

In operation S405, the image processor 30 may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of the current block $BL_n$ of the current image $IN_n$ by using the first minimum value $MIN_{n-2}$, the first maximum value $MAX_{n-2}$, and the first average value $MM_{n-2}$ of the corresponding block $BL_{n-2}$ in the second previous image $IN_{n-2}$ and the first lower average value $LM_{n-1}$ and the first upper average value $HM_{n-1}$ of the corresponding block $BL_{n-1}$ in the first previous image $IN_{n-1}$.

In operation S60, the image processor 30 may calculate an output value obtained by correcting a pixel value of the current image $IN_n$ in units of blocks. The image processor 30 may set the output minimum value Tmin, the output maximum value Tmax, the output average value Tmm, the output lower average value Tlm, and the output upper average value Thm respectively corresponding to the reference minimum value $MIN_{rn}$, the reference maximum value $MAX_{rn}$, the reference average value $MM_{rn}$, the reference lower average value $LM_{rn}$, and the reference upper average value $HM_{rn}$ of the current image $IN_n$, in units of blocks.

The image processor 30 may set the output average value Tmm, the output lower average value Tlm, and the output upper average value Thm as output values to pixels whose pixel values of the current image $IN_n$ are the same as the reference average value $MM_{rn}$, the reference lower average value $LM_{rn}$, and the reference upper average value $HM_{rn}$, in units of blocks. The image processor 30 may set an output value calculated by interpolation of the output minimum value Tmin and the output lower average value Tlm to pixels whose pixel values are between the reference minimum value $MIN_{rn}$ and the reference lower average value $LM_{rn}$. The image processor 30 may set an output value calculated by interpolation of the output lower average value Tlm and the output average value Tmm to pixels whose pixel values are between the reference lower average value $LM_{rn}$ and the reference average value $MM_{rn}$. The image processor 30 may set an output value calculated by interpolation of the output average value Tmm and the output upper average value Thm whose pixel values are between the reference average value $MM_{rn}$ and the reference upper average value $HM_{rn}$. The image processor 30 may set an output value calculated by interpolation of the output upper average value Thm and the output maximum value Tmax whose pixel values are between the reference upper average value $HM_{rn}$ and the reference maximum value $MAX_{rn}$.

Figure 9:
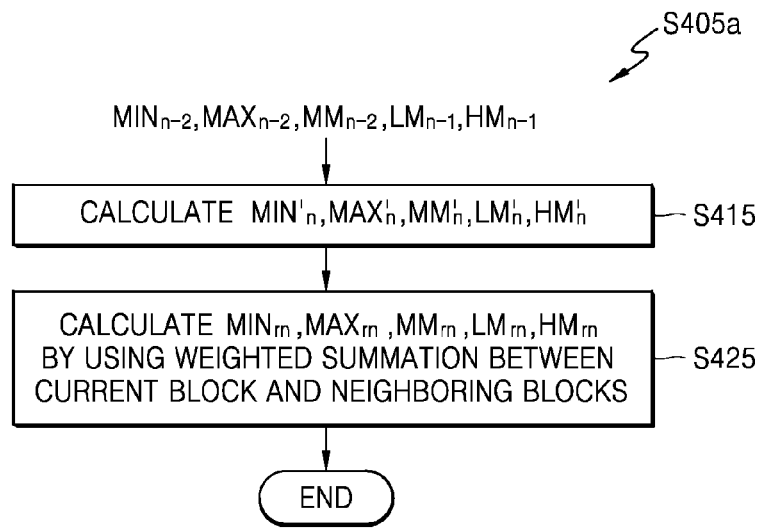

FIG. 9 is a diagram illustrating operation 405 of FIG. 8 according to an embodiment.

Referring to FIG. 9, in operation S415, the image processor 30 may calculate the first minimum value $MIN_{n-2}$, the first maximum value $MAX_{n-2}$, and the first average value $MM_{n-2}$ of the corresponding block $BL_{n-2}$ in the second previous image $IN_{n-2}$, and the first lower average value $LM_{n-1}$ and the first upper average value $HM_{n-1}$ of the corresponding block $BL_{n-1}$ in the first previous image $IN_{n-1}$ as the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$.

In operation S425, the image processor 30 may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of the current block $BL_n$ of the current image $IN_n$ by using weighted summation of second values between the current block $BL_n$ and the neighboring blocks $BL_{nn}$ in the current image $IN_n$. The second values are the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$. The image processor 30 may apply the first weight that is inversely proportional to a center distance between the current block $BL_n$ and the neighboring blocks $BL_{nn}$ to the current block $BL_n$ and the neighboring blocks $BL_{nn}$. That is, a first weight of the current block $BL_n$ may have a highest value.

Figure 10:
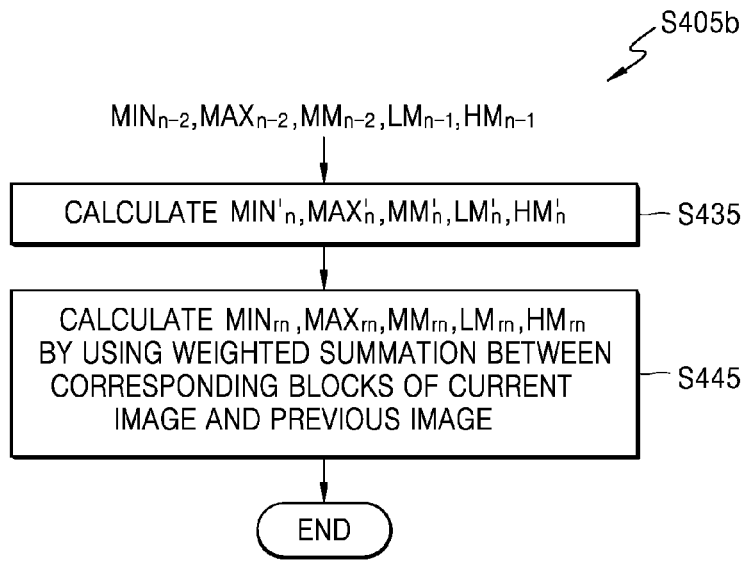

FIG. 10 is a diagram illustrating operation 405 of FIG. 8 according to another embodiment.

Referring to FIG. 10, in operation S435, the image processor 30 may set the first minimum value $MIN_{n-2}$, the first maximum value $MAX_{n-2}$, and the first average value $MM_{n-2}$ of the corresponding block $BL_{n-2}$ in the second previous image $IN_{n-2}$, and the first lower average value $LM_{n-1}$ and the first upper average value $HM_{n-1}$ of the corresponding block $BL_{n-1}$ in the first previous image $IN_{n-1}$ as the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$, respectively.

In operation S445, the image processor may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of each block in the current image $IN_n$ by using weighted summation of second values between corresponding blocks of the current image $IN_n$ and a previous image. The previous image may be the first previous image $IN_{n-1}$. The second values are the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$, and the second minimum value $MIN_{n-1}'$, the second maximum value $MAX_{n-1}'$, the second average value $MM_{n-1}'$, the second lower average value $LM_{n-1}'$, and the second upper average value $HM_{n-1}'$ of the corresponding block $BL_{n-1}$ in the first previous image $IN_{n-1}$. The image processor 30 may apply the second weight according to an alpha value for alpha blending to corresponding blocks of the current image $IN_n$ and the first previous image $IN_{n-1}$. A sum of the second weight applied to the current block $BL_n$ of the current image $IN_n$ and the second weight applied to the corresponding block $BL_{n-1}$ in the first previous image $IN_{n-1}$ is 1.

The image processor 30 may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of the current block $BL_n$ of the current image $IN_n$ by weighted summing the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$ with the second minimum value $MIN_{n-1}'$, the second maximum value $MAX_{n-1}'$, the second average value $MM_{n-1}'$, the second lower average value $LM_{n-1}'$, and the second upper average value $HM_{n-1}'$ of the corresponding block $BL_{n-1}$ in the first previous image $IN_{n-1}$.

Figure 11:
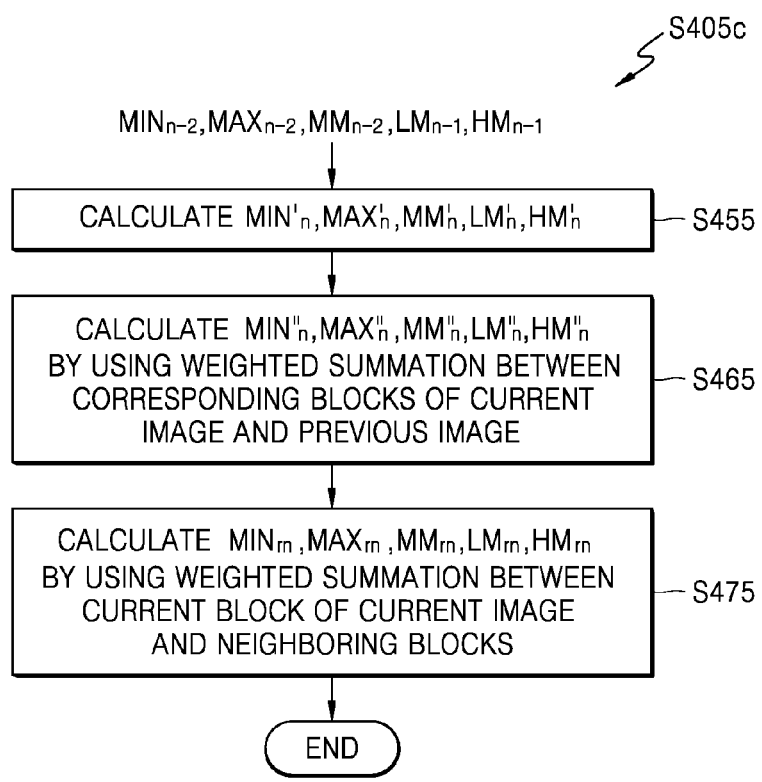

FIG. 11 is a diagram illustrating operation 405 of FIG. 8 according to another embodiment.

Referring to FIG. 11, in operation S455, the image processor 30 may set the first minimum value $MIN_{n-2}$, the first maximum value $MAX_{n-2}$, and the first average value $MM_{n-2}$ of the corresponding block $BL_{n-2}$ in the second previous image $IN_{n-2}$, and the first lower average value $LM_{n-1}$ and the first upper average value $HM_{n-1}$ of the corresponding block $BL_{n-1}$ in the first previous image $IN_{n-1}$ as the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$, respectively.

In operation S465, the image processor 30 may calculate the third minimum value $MIN_n''$, the third maximum value $MAX_n''$, the third average value $MM_n''$, the third lower average value $LM_n''$, and the third upper average value $HM_n''$ of each block in the current image $IN_n$ by using weighted summation of second values between corresponding blocks of the current image $IN_n$ and a previous image. The previous image may be the first previous image $IN_{n-1}$. The second values are the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$, and the second minimum value $MIN_{n-1}'$, the second maximum value $MAX_{n-1}'$, the second average value $MM_{n-1}'$, the second lower average value $LM_{n-1}'$, and the second upper average value $HM_{n-1}'$ of the corresponding block $BL_{n-1}$ in the first previous image $IN_n\_1$. The image processor 30 may apply the second weight to corresponding blocks of the current image $IN_n$ and the first previous image $IN_{n-1}$ for alpha blending of the corresponding blocks of the current image $IN_n$ and the first previous image $IN_{n-1}$. The second weight applied to the current block $BL_n$ of the current image $IN_n$ may be an alpha value of the alpha blending.

The image processor 30 may calculate the third minimum value $MIN_n''$, the third maximum value $MAX_n''$, the third average value $MM_n''$, the third lower average value $LM_n''$, and the third upper average value $HM_n''$ of the current block $BL_n$ of the current image $IN_n$ by weighted summing the second minimum value $MIN_n'$, the second maximum value $MAX_n'$, the second average value $MM_n'$, the second lower average value $LM_n'$, and the second upper average value $HM_n'$ of the current block $BL_n$ of the current image $IN_n$ with the second minimum value $MIN_n'$, the second maximum value $MAX_n'$, the second average value $MM_n'$, the second lower average value $LM_n'$, and the second upper average value $HM_n'$ of the corresponding block $BL_{n-1}$ in the first previous image $IN_{n-1}$.

In operation S475, the image processor 30 may calculate the reference minimum value $MIN_{rn}$, the reference maximum value $MAX_{rn}$, the reference average value $MM_{rn}$, the reference lower average value $LM_{rn}$, and the reference upper average value $HM_{rn}$ of the current image $IN_n$ by using weighted summation of the third values between the current block $BL_n$ and the neighboring blocks $BL_{nn}$ of the current image $IN_n$. The image processor 30 may apply the first weight that is inversely proportional to a center distance between the current block $BL_n$ and the neighboring blocks $BL_{nn}$ to the current block $BL_n$ and the neighboring blocks $BL_{nn}$. That is, a first weight of the current block $BL_n$ may have a highest value.

Block-based histogram equalization that enhances the contrast of an image by dividing an image into blocks, obtaining a histogram of each block, and equalizing the histogram requires a memory for storing a histogram for each brightness of the image. For example, in order to enhance the contrast of an image having 256 levels of brightness and a resolution of 1920×1088 in units of block having a size of 64×64, 30×17 blocks are used and $256×2^{12}$ bit-memory is used for each block. That is, large 30×17× 256×4096 bit (=65,280 kB)-memory is required. Since a large amount of memory is required, it is not easy to implement the memory in hardware.

However, the inventive concept does not obtain all histograms of blocks, and uses only a minimum value, a lower average value, an average value, an upper average value, and a maximum value of each block. That is, since 5 memory spaces, instead of 256 memory spaces, are used to calculate histograms, contrast enhancement effect that is similar to that of conventional block-based histogram equalization may be achieved and the amount of memory capacity for storing the values may be reduced to 5/256.

An image processing apparatus according to the one or more embodiments may improve image quality and memory efficiency.

The embodiments may also be implemented as computer-readable codes on a computer-readable recording medium. The computer-readable recording medium is any data storage device that may store data which may thereafter be read by a computer system. Examples of the computer-readable recording medium include ROMs, RAMs, CD-ROMs, magnetic tapes, floppy disks, optical data storage devices, etc. The computer-readable recording medium may also be distributed over network coupled computer systems so that the computer-readable code is stored and executed in a distributive manner. Also, functional programs, codes, and code segments for accomplishing the present disclosure may be easily construed by programmers skilled in the art to which the present disclosure pertains.

While the inventive concept has been particularly shown and described with reference to embodiments thereof, they are provided for the purposes of illustration and it will be understood by one of ordinary skill in the art that various modifications and equivalent other embodiments may be made from the inventive concept. Accordingly, the true technical scope of the inventive concept is defined by the technical spirit of the appended claims.

What is claimed is:

1. An image processing apparatus comprising at least one processor to implement:
   a divider configured to divide a current image into a plurality of blocks;
   a first calculator configured to calculate a first minimum value, a first maximum value, and a first average value of each block in the current image;

a second calculator configured to calculate a first lower average value and a first upper average value of each block in the current image by using the first minimum value, the first maximum value, and the first average value of each corresponding block in a first previous image prior to the current image;

a third calculator configured to calculate a reference minimum value, a reference maximum value, a reference average value, a reference lower average value, and a reference upper average value of each block in the current image by using the first minimum value, the first maximum value, and the first average value of each corresponding block in a second previous image prior to the first previous image and the first lower average value and the first upper average value of each corresponding of block in the first previous image; and a corrector configured to change an output value of each pixel of the current image to a predetermined value in units of the blocks by using the reference minimum value, the reference maximum value, the reference average value, the reference lower average value, and the reference upper average value of each block in the current image.

2. The image processing apparatus of claim 1, wherein the third calculator is configured to:

set the first minimum value, the first maximum value, and the first average value of each corresponding block in the second previous image and the first lower average value and the first upper average of each corresponding block in the first previous image as a second minimum value, a second maximum value, a second average value, a second lower average value, and a second upper average value of each block in the current image, respectively; and calculate the reference minimum value, the reference maximum value, the reference average value, the reference lower average value, and the reference upper average value of each block in the current image by performing weighted summation of the second minimum values, the second maximum values, the second average values, the second lower average values, and the second upper average values of each block and neighboring blocks in the current image by using a weight that is inversely proportional to a center distance between each block and the neighboring blocks in the current image.

3. The image processing apparatus of claim 1, wherein the corrector generates the output value of each pixel of the current image by setting pixel values of each block in the current image to one of an output minimum value, an output maximum value, an output average value, an output lower average value, and an output upper average value which are predetermined and respectively corresponding to the reference minimum value, the reference maximum value, the reference average value, the reference lower average value, and the reference upper average value of each block in the current image.

4. The image processing apparatus of claim 3, wherein the corrector is further configured to set a pixel value determined by interpolation of the output minimum value, the output maximum value, the output average value, the output lower average value, and the output upper average value to a pixel whose pixel value is between the reference minimum value, the reference maximum value, the reference average value, the reference lower average value, and the reference upper average value of each block in the current image.

5. The image processing apparatus of claim 3, wherein the output minimum value, the output maximum value, the output average value, the output lower average value, and the output upper average value are set according to a gray level of the current image.

6. The image processing apparatus of claim 1, wherein the third calculator is configured to:

set the first minimum value, the first maximum value, and the first average value of each corresponding block in the second previous image and the first lower average value and the first upper average value of each corresponding block in the first previous image as a second minimum value, a second maximum value, a second average value, a second lower average value, and a second upper average value of each block in the current image, respectively; and calculate the reference minimum value, the reference maximum value, the reference average value, the reference lower average value, and the reference upper average value of each block in the current image by performing weighted summation of the second minimum value, the second maximum value, the second average value, the second lower average value, and the second upper average value of each block in the current image and the second minimum value, the second maximum value, the second average value, a second lower average value, and a second upper average value of each corresponding block in the first previous image.

7. The image processing apparatus of claim 1, wherein the third calculator is configured to:

set the first minimum value, the first maximum value, and the first average value of each corresponding block in the second previous image, and the first lower average value and the first upper average value of each corresponding block in the first previous image as a second minimum value, a second maximum value, a second average value, a second lower average value, and a second upper average value of each block in the current image, respectively;

calculate a third minimum value, a third maximum value, a third average value, a third lower average value, and a third upper average value of each block in the current image by performing weighted summation of the second minimum value, the second maximum value, the second average value, the second lower average value, and the second upper average value of each block in the current image and the second minimum value, the second maximum value, the second average value, the second lower average value, and the second upper average value of each corresponding block in the first previous image; and calculate the reference minimum value, the reference maximum value, the reference average value, the reference lower average value, and the reference upper average value of each block in the current image by performing weighted summation of the third minimum values, the third maximum values, the third average values, the third lower average values, and the third upper average values of each block and neighboring blocks in the current image by using a weight that is inversely proportional to a center distance between each block and neighboring blocks in the current image.

8. An image processing method comprising:
dividing a current image into a plurality of blocks;
calculating a first minimum value, a first maximum value, and a first average value of each block in the current image;
calculating a first lower average value and a first upper average value of each block in the current image by using the first minimum value, the first maximum value, and the first average value of each corresponding block in a first previous image prior to the current image;
calculating a reference minimum value, a reference maximum value, a reference average value, a reference lower average value, and a reference upper average value of each block in the current image by using the first minimum value, the first maximum value, and the first average value of each corresponding block in a second previous image prior to the first previous image and the first lower average value and the first upper average value of each corresponding block in the first previous image; and
changing an output value of each pixel of the current image to a predetermined value in units of the blocks by using the reference minimum value, the reference maximum value, the reference average value, the reference lower average value, and the reference upper average value of each block in the current image.

9. The image processing method of claim 8, wherein the calculating the reference values comprises:
setting the first minimum value, the first maximum value, and the first average value of each corresponding block in the second previous image and the first lower average value and the first upper average value of each corresponding block in the first previous image as a second minimum value, a second maximum value, a second average value, a second lower average value, and a second upper average value of each block in the current image, respectively; and
calculating the reference minimum value, the reference maximum value, the reference average value, the reference lower average value, and the reference upper average value of each block in the current image by performing weighted summation of the second minimum values, the second maximum values, the second average values, the second lower average values, and the second upper average values of each block and neighboring blocks in the current image by applying a weight that is inversely proportional to a center distance between each block and the neighboring blocks in the current image.

10. The image processing method of claim 8, wherein the generating the output value of each pixel of the current image comprises setting pixel values of each block in the current image to one of an output minimum value, an output maximum value, an output average value, an output lower average value, and an output upper average value which are predetermined and respectively corresponding to the reference minimum value, the reference maximum value, the reference average value, the reference lower average value, and the reference upper average value of each block in the current image.

11. The image processing method of claim 10, wherein the generating of output value comprises setting a pixel value determined by interpolation of the output minimum value, the output maximum value, the output average value, the output lower average value, and the output upper average value to a pixel whose pixel value is between the reference minimum value, the reference maximum value, the reference average value, the reference lower average value, and the reference upper average value of each block in the current image.

12. The image processing method of claim 10, wherein the output minimum value, the output maximum value, the output average value, the output lower average value, and the output upper average value are set according to a gray level of the current image.

13. The image processing method of claim 8, wherein the calculating the reference values comprises:
setting the first minimum value, the first maximum value, and the first average value of each corresponding block in the second previous image and the first lower average value and the first upper average value of each corresponding block in the first previous image as a second minimum value, a second maximum value, a second average value, a second lower average value, and a second upper average value of each block in the current image, respectively; and
calculating the reference minimum value, the reference maximum value, the reference average value, the reference lower average value, and the reference upper average value of each block in the current image by performing weighed summation of the second minimum value, the second maximum value, the second average value, the second lower average value, and the second upper average value of each block in the current image, and the second minimum value, the second maximum value, the second average value, the second lower average value, and the second upper average value of each corresponding block in the first previous image.

14. The image processing method of claim 8, wherein the calculating the reference values comprises:
setting the first minimum value, the first maximum value, and the first average value of each corresponding block in the second previous image, and the first lower average value and the first upper average value of each corresponding block in the first previous image as a second minimum value, a second maximum value, a second average value, a second lower average value, and a second upper average value of each block in the current image, respectively;
calculating a third minimum value, a third maximum value, a third average value, a third lower average value, and a third upper average value of each block in the current image by performing weighted summation of the second minimum value, the second maximum value, the second average value, the second lower average value, and the second upper average value of each block in the current image, and the second minimum value, the second maximum value, the second average value, the second lower average value, and the second upper average value of each corresponding block in the first previous image; and
calculating the reference minimum value, the reference maximum value, the reference average value, the reference lower average value, and the reference upper average value of each block in the current image by performing weighted summation of the third minimum values, the third maximum values, the third average values, the third lower average values, and the third upper average values of each block and neighboring blocks in the current image by using a weight that is inversely proportional to a center distance between each block and the neighboring blocks in the current image.

15. An image processing apparatus comprising:
a divider configured to divide an image into a plurality of blocks;
a first calculator configured to calculate a minimum value, a maximum value, and an average value of each block in a first image;
a second calculator configured to calculate a lower average value and an upper average value of each block in a second image subsequent to the first image, the lower average value being a pixel value average of pixels between the minimum value and the average value of a corresponding block in the first image, and the upper average value being a pixel value average of pixels between the maximum value and the average value of the corresponding block in the first image;
a third calculator configured to calculate a reference minimum value, a reference maximum value, a reference average value, a reference lower average value, and a reference upper average value of each block in a third image subsequent to the second image by using the minimum value, the maximum value, and the average value of the corresponding block in the first image and the lower average value and the upper average value of a corresponding block in the second image; and
a corrector configured to generate an output value obtained by changing pixel values of pixels of each block in the third image to predetermined values, based on the reference minimum value, the reference maximum value, the reference average value, the reference lower average value, and the reference upper average value of each block in the third image.

16. The image processing apparatus of claim 15, wherein the third calculator is configured to:
set a first minimum value, a first maximum value, and a first average value of each corresponding block in the first image, and a first lower average value and a first upper average value of each corresponding block in the second image as a second minimum value, a second maximum value, a second average value, a second lower average value, and a second upper average value of each block in the third image, respectively; and
calculate the reference minimum value, the reference maximum value, the reference average value, the reference lower average value, and the reference upper average value of each block in the third image by performing weighted summation of the second minimum values, the second maximum values, the second average values, the second lower average values, and the second upper average values of each block and neighboring blocks in the third image by using a weight that is inversely proportional to a center distance between each block and the neighboring blocks of the third image.

17. The image processing apparatus of claim 15, wherein the corrector changes the pixel values of pixels of each block in the third image by setting the pixel values of pixels of each block in the third image to one of an output minimum value, an output maximum value, an output average value, an output lower average value, and an output upper average value which are predetermined and respectively corresponding to the reference minimum value, the reference maximum value, the reference average value, the reference lower average value, and the reference upper average value of each block in the third image.

18. The image processing apparatus of claim 17, wherein the output minimum value, the output maximum value, the output average value, the output lower average value, and the output upper average value are set according to a gray level of the third image.

19. The image processing apparatus of claim 15, wherein the third calculator is configured to:
set a first minimum value, a first maximum value, and a first average value of each corresponding block in the first image, and a first lower average value and a first upper average value of each corresponding block in the second image as a second minimum value, a second maximum value, a second average value, a second lower average value, and a second upper average value of each block in the third image, respectively; and
calculate the reference minimum value, the reference maximum vale, the reference average value, the reference lower average value, and the reference upper average value of each block in the third image by performing weighted summation of the second minimum value, the second maximum value, the second average value, the second lower average value, and the second upper average value of each block in the third image and the second minimum value, the second maximum value, the second average value, the second lower average value, and the second upper average value of each corresponding block in the second image.

20. The image processing apparatus of claim 15, wherein the third calculator is configured to:
set a first minimum value, a first maximum value, and a first average value of each corresponding block in the first image, and a first lower average value and a first upper average value of each corresponding block in the second image as a second minimum value, a second maximum value, a second average value, a second lower average value, and a second upper average value of each block in the third image, respectively;
calculate a third minimum value, a third maximum value, a third average value, a third lower average value, and a third upper average value of each block in the third image by weighted summation of the second minimum value, the second maximum value, the second average value, the second lower average value, and the second upper average value of each block in the third image, and the second minimum value, the second maximum value, the second average value, the second lower average value, and the second upper average value of each corresponding block in the second image; and
calculate the reference minimum value, the reference maximum value, the reference average value, the reference lower average value, and the reference upper average value of each block in the third image by performing weighted summation of the third minimum values, the third maximum values, the third average values, the third lower average values, and the third upper average values of each block and neighboring blocks in the third image by using a weight that is inversely proportional to a center distance between each block and the neighboring blocks in the third image.

* * * * *